US012664722B2

(12) United States Patent
Fletcher et al.

(10) Patent No.: US 12,664,722 B2
(45) Date of Patent: Jun. 23, 2026

(54) METHOD FOR GENERATING A SHIMMER VIEW OF A PHYSICAL OBJECT

(71) Applicant: Bandicoot Imaging Sciences Pty Ltd, Elanora Heights (AU)

(72) Inventors: Peter Alleine Fletcher, Elanora Heights (AU); Matthew Raphael Arnison, Elanora Heights (AU); David Robert James Monaghan, Elanora Heights (AU); David Karlov, Elanora Heights (AU)

(73) Assignee: Bandicoot Imaging Sciences Pty Ltd, Kalang Heights (AU)

( * ) Notice: Subject to any disclaimer, the term of this patent is extended or adjusted under 35 U.S.C. 154(b) by 180 days.

(21) Appl. No.: 18/572,388

(22) PCT Filed: Jun. 24, 2022

(86) PCT No.: PCT/AU2022/050647
§ 371 (c)(1),
(2) Date: Dec. 20, 2023

(87) PCT Pub. No.: WO2022/266719
PCT Pub. Date: Dec. 29, 2022

(65) Prior Publication Data
US 2024/0290033 A1 Aug. 29, 2024

(30) Foreign Application Priority Data
Jun. 24, 2021 (AU) ................................ 2021901901

(51) Int. Cl.
*G06T 15/50* (2011.01)
*G06T 7/55* (2017.01)
(Continued)

(52) U.S. Cl.
CPC .............. *G06T 15/506* (2013.01); *G06T 7/55* (2017.01); *G06T 15/005* (2013.01); *G06T 15/04* (2013.01);
(Continued)

(58) Field of Classification Search
CPC ....... G06T 15/506; G06T 7/55; G06T 15/005; G06T 15/04; G06T 17/20; G06T 2200/08;
(Continued)

(56) References Cited

U.S. PATENT DOCUMENTS

2012/0263393 A1* 10/2012 Yahil ......................... G06T 5/70
382/264
2017/0200302 A1 7/2017 Haveman
(Continued)

FOREIGN PATENT DOCUMENTS

AU 2019201822 A1 10/2020

OTHER PUBLICATIONS https://web.archive.org/web/20210401150727/https://www.bandicootimaging.com.au/guide/ published on Apr. 1, 2021 as per Wayback Machine (1 pg).
(Continued)

*Primary Examiner* — Xiao M Wu
*Assistant Examiner* — Latrell Anthony Creary
(74) *Attorney, Agent, or Firm* — Christensen, Fonder, Dardi & Busse PLLC; John P. Fonder

(57) ABSTRACT

A method for associating a plurality of pixels in a plurality of optical images of a physical object wherein the plurality of optical images are associated with a plurality of camera poses with respect to the physical object, and a method for generating shimmer view information of a physical object.

16 Claims, 5 Drawing Sheets

(51) Int. Cl.
  *G06T 15/00*     (2011.01)
  *G06T 15/04*     (2011.01)
  *G06T 17/20*     (2006.01)

(52) U.S. Cl.
  CPC .......... *G06T 17/20* (2013.01); *G06T 2200/08* (2013.01); *G06T 2207/30204* (2013.01); *G06T 2207/30244* (2013.01)

(58) Field of Classification Search
  CPC . G06T 2207/30204; G06T 2207/30244; G06T 7/74
  See application file for complete search history.

(56) References Cited

U.S. PATENT DOCUMENTS

| | | | |
|---|---|---|---|
| 2018/0122144 A1* | 5/2018 | Hubo | ..................... G06T 15/20 |
| 2020/0311442 A1 | 10/2020 | Shibata et al. | |
| 2021/0109987 A1 | 4/2021 | Avila et al. | |

OTHER PUBLICATIONS

Ha, H., et al., "High-Quality Depth from Uncalibrated Small Motion Clip," *2016 IEEE Conference on Computer Vision and Pattern Recognition (CVPR)*, Las Vegas, NV, USA, 2016, pp. 5413-5421.

* cited by examiner

METHOD FOR GENERATING A SHIMMER VIEW OF A PHYSICAL OBJECT

PRIORITY CLAIM

The present application is a National Phase entry of PCT Application No. PCT/AU2022/050647, filed Jun. 24, 2022, which claims the benefit of Australian Patent Application No. 2021901901, filed Jun. 24, 2021, which are incorporated herein by reference in their entirety.

TECHNICAL FIELD

The disclosure herein generally relates to a method for associating a plurality of pixels in a plurality of optical images of a physical object, and particularly but not exclusively a method for generating shimmer view information of a physical object.

BACKGROUND

A physical object may be photographed to generate image information in the form of a digital image file. The image information can subsequently be used to show an image of the physical object on an electronic display of a machine, examples of which include but are not limited to a personal computer, tablet and smart phone. Examples of possible uses of such image information include but are not limited to:

Generating a representation of an aircraft in a pilot training simulation machine.

Generation of visual special effects for video media.

Improved graphical representations of objects—for example a building, apparel or another manufactured item—defined by a computer aided design software file.

Creation of virtual objects to be used instead of physical samples, for example fabric swatch books.

On e-commerce web sites and online stores, example of which include but are not limited to ebay.com, alibaba.com and amazon.com.

Video games.

It may be technically challenging to reproduce some visual elements of the physical object in an image shown on an electronic display. Examples of technically challenging visual elements include but are not limited to:

color texture gloss the play of light on the physical object, examples of which include but are not limited to a fabric incorporating a reflective thread or print, a leather good.

In the context of e-commerce web sites and online stores, the inability of online images to represent some qualities of a good on offer may detract from shopping experience. This may, for example, decrease engagement and reduce sales. Consumers may be misled as to the visual qualities of the good on offer, which may result in them returning the good after purchase, which may be at the owner's expense.

To address this problem a "360 product animation" may be generated, which may show the object as if it were rotating on a turntable. This technique, however, generally provides a limited sense of the object appearance and is not appropriate for at least some of the above described uses of image information.

In some circumstances, graphical representations of physical objects that convey more visual qualities of the physical object may be desirable.

SUMMARY

Disclosed herein is a method for generating shimmer view information for a physical object, the method comprising the steps of:

generating image information for the physical object indicative of a plurality of photographs of the physical object associated with a plurality of camera poses;

generating shape information indicative of the shape of the physical object;

generating physical object reflection information indicative of a light reflective property of the physical object; and processing the image information to determine the plurality of camera poses;

wherein for each point of a plurality of points of the physical object, a plane sweep algorithm is executed to associate a plurality of pixels defined by the image information corresponding to the point and calculate a merit function comprising a gradient phase.

Disclosed herein is non-transitory processor readable tangible media including program instructions which when executed by a processor causes the processor to perform the above disclosed method.

Disclosed herein is a computer program for instructing a processor, which when executed by the processor causes the processor to perform the above disclosed method.

Disclosed herein is method for generating shimmer view information for a physical object, the method comprising associating a plurality of pixels in a plurality of optical images of a physical object, wherein the plurality of optical images are associated with a plurality of camera poses with respect to the physical object;

disposing the physical object at a plurality of camera pose markers;

generating image information for the plurality of camera pose markers and the physical object disposed at the plurality of camera pose markers;

using the image information to determine camera pose information indicative of the plurality of camera poses associated with the image information;

determining physical object spatial information indicative of a three dimensional representation of the physical object using the image information and the camera pose information; and using physical object spatial information to associate a plurality of pixels in the image information;

wherein associating the plurality of pixels in the plurality of optical images comprises comparing pixels using a merit function using a gradient phase of pixels within the image information.

Disclosed herein is non-transitory processor readable tangible media including program instructions which when executed by a processor causes the processor to perform the above disclosed method.

Disclosed herein is a computer program for instructing a processor, which when executed by the processor causes the processor to perform the above disclosed method.

Disclosed herein is a processor for displaying a shimmer view of a physical object comprising a video signal interface for sending video signals to an electronic display, and memory in which is stored shimmer view information and shimmer view rendering program instructions which when executed by the processor cause the processor to use the shimmer view information to generate a video signal indicative of a shimmer view of the physical object and send the video signal indicative of the shimmer view of the physical object via the video signal interface.

In an embodiment, the program instructions cause the processor to use the shimmer view information and a WebGL shader model to generate the video signal indicative of the shimmer view.

In an embodiment, the program instructions when executed by the processor cause the processor to receive user interface information generated by a user operating a user interface and change the video signal to indicate another shimmer view in accordance with the user interface information.

An embodiment comprises sending the changed video signal to the video signal interface.

In an embodiment, the program instructions when executed by the processor cause the processor to generate one of a movie file and an image file for the shimmer view.

In an embodiment, the shimmer view information comprises physical object shape information indicative of the shape of the physical object and physical object reflection information indicative of a light reflective property of the physical object.

In an embodiment, the physical object reflection information comprises a bidirectional reflection distribution information. The physical reflection information may conform to a bidirectional reflection distribution, in the form of a function or model for example.

Disclosed herein is non-transitory processor readable tangible media including shimmer view information for a physical object, the shimmer view information comprising physical object shape information indicative of the shape of the physical object and physical object reflection information indicative of a light reflective property of the physical object.

Disclosed herein is a method for generating shimmer view information for a physical object, the method comprising the steps of:

generating image information for the physical object indicative of a plurality of photographs of the physical object associated with a plurality of camera poses;

generating shape information indicative of the shape of the physical object; and generating physical object reflection information indicative of a light reflective property of the physical object.

An embodiment comprises processing the image information to determine the plurality of camera poses.

In an embodiment, for each point of a plurality of points on the surface of the physical object, associating a plurality of pixels defined by the image information corresponding to the point on the surface of the physical object.

In an embodiment, the step of associating the plurality of pixels comprises executing a plane sweep algorithm.

In an embodiment, the plane sweep algorithm is for calculating a merit function comprising a gradient phase.

In an embodiment, the plurality of photographs of the physical object are also of a plurality of pose makers.

In an embodiment, the physical object reflection information comprises a bidirectional reflection distribution function information. The physical reflection information may conform to a bidirectional reflection distribution, in the form of a function or model for example.

In an embodiment, the bidirectional reflection distribution function model comprises a WebGL shader model.

Disclosed herein is a processor for generating shimmer view information for a physical object, the processor comprising memory in which is stored program instructions which when executed by the processor causes the processor to perform the method disclosed above.

Disclosed herein is a method for associating a plurality of pixels in a plurality of optical images of a physical object. The plurality of optical images are associated with a plurality of camera poses with respect to the physical object.

In an embodiment, the associated plurality of pixels correspond to the same point on the surface of the physical object.

Disclosed herein is a method for generating shimmer view information of a physical object, the method comprising the method for associating pixels disclosed above.

In an embodiment, the shimmer view of the physical object includes a visual representation of the object's external geometry and a representation of the reflection of an illuminating light from the object's surface.

An embodiment comprises rendering the shimmer view information to generate an interactive visual representation of the physical object on an electronic display.

An embodiment comprises the step of disposing the physical object at a plurality of camera pose markers.

In an embodiment, the plurality of camera pose markers define an inner space for receiving the physical object.

In an embodiment, the plurality of camera pose markers are arranged for determining, from an image of the plurality of camera pose markers, the spatial and angular position of a camera that was used to generate the image.

An embodiment comprises generating image information for the plurality of camera pose markers and the physical object disposed at the plurality of caner pose markers.

In an embodiment, the image information is associated with a plurality of camera poses.

An embodiment comprises using the image information to determine camera pose information indicative of the plurality of camera poses associated with the image information.

An embodiment comprises generating the image information comprises generating the image information with a digital camera.

An embodiment comprises determining the camera pose information is within a processor.

An embodiment comprises determining physical object spatial information indicative of a three dimensional representation of the physical object using the image information and the camera pose information.

An embodiment comprises using physical object spatial information to associate a plurality of pixels in the image information.

An embodiment comprises generating texture map information indicative of a texture map of the physical object using the associated plurality of pixels in the plurality of optical images.

An embodiment comprises generating meshed physical object spatial information indicative of the surface using the texture map information and the physical object spatial information.

In an embodiment, associating the plurality of pixels in the plurality of optical images comprises comparing pairs of pixels using a merit function using gradients of the intensity of pixels within the image information.

An embodiment comprises using an intermediate space in which gradients are calculated.

Disclosed herein is a processor for generating shimmer view information of a physical object, the processor being operable to execute a method disclosed above.

Disclosed herein is non-transitory processor readable tangible media including program instructions which when executed by a processor causes the processor to perform a method disclosed above.

Disclosed herein is a computer program for instructing a processor, which when executed by the processor causes the processor to perform a method disclosed above.

Any of the various features of each of the above disclosures, and of the various features of the embodiments described below, can be combined as suitable and desired.

BRIEF DESCRIPTION OF THE FIGURES

Embodiments will now be described by way of example only with reference to the accompanying figures in which.

DESCRIPTION OF EMBODIMENTS

Figure 2:
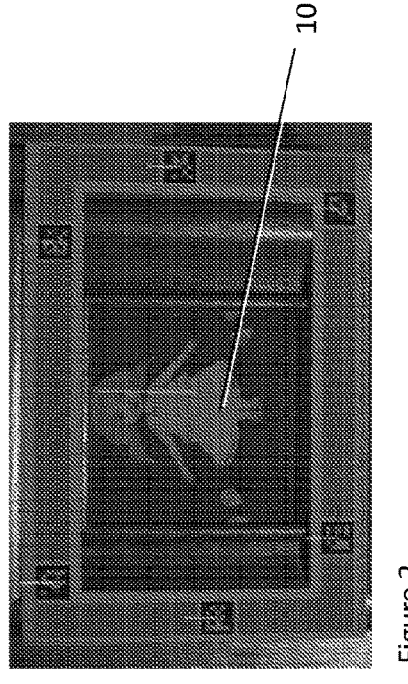
FIGS. 1 to 4 each show a photograph of a physical object in the form of a picture in a frame, the camera used to take the photographs having been at different positions and orientations relative to the physical object for each of the digital photographs, in which the play of light on the physical object changes from one camera position and orientation to another.
Figure 4:
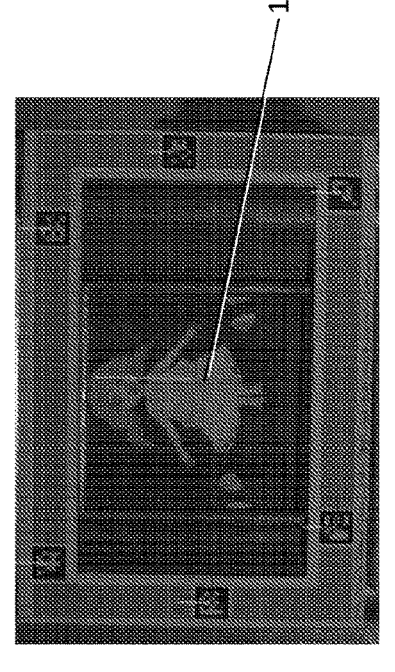
Figure 1:
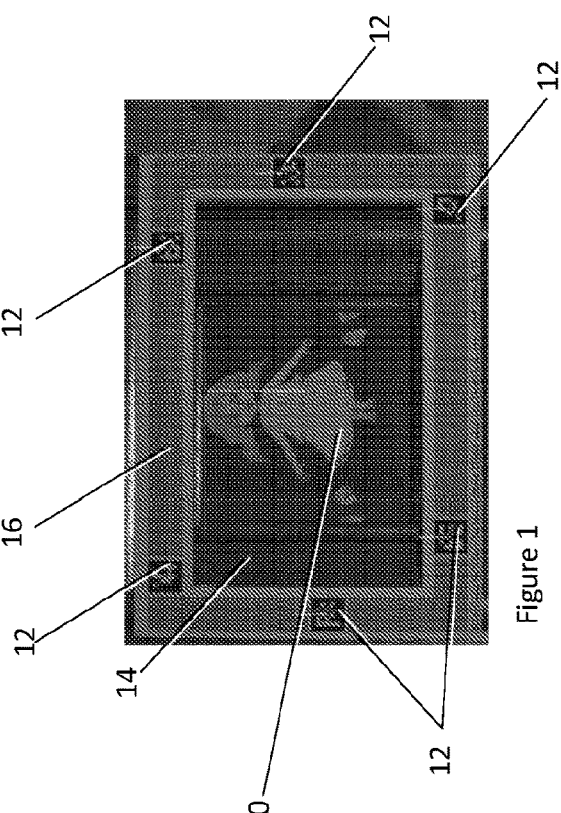
Figure 3:
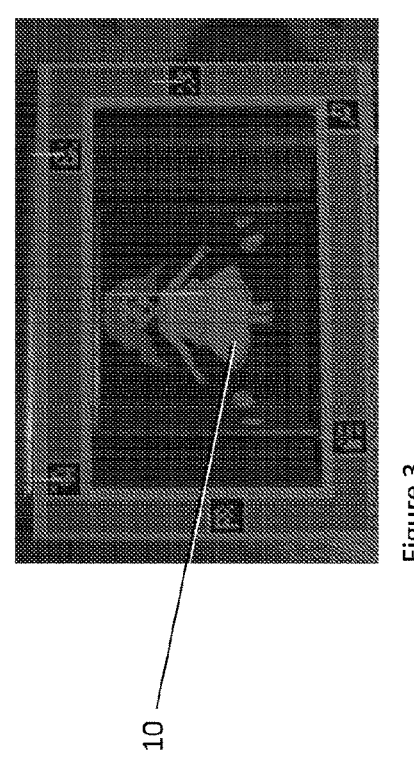

Described herein are embodiments for generating shimmer view information of a physical object. The shimmer view information is for displaying a shimmer view of the physical object on an electronic display.

A shimmer view of a physical object comprises a visual representation of the object's external geometry (that is, shape) and a representation of the reflection of an illuminating light from the object's surface. A shimmer view of a physical object may generally reproduce visual elements of the physical object not generally captured using conventional photography, examples of which include but are not necessarily limited to texture, gloss, the play of light on the physical object, and color.

An embodiment of a method for generating the shimmer view information of the physical object comprises an embodiment of a method for associating a plurality of pixels defined by image information for the physical object. The associated plurality of pixels correspond to the same point on the surface of the physical object. The image information defines a plurality of images of the physical object. Generally, but not necessarily, each of the plurality of images is generated using a digital camera having a different orientation and position with respect to the physical object.

Camera pose information defines, for each of the plurality of images, at least one of camera position and camera orientation. The camera pose information can additionally consist of at least one of a camera focal parameter and a camera image distortion model. The plurality of images are associated with camera pose information.

In some examples of shimmer views of physical objects, the sheen of satin, the complex structure of leather, and the yellow shininess of gold may all be captured. A shimmer view is generally shown on an electronic display of an electronic device, examples of which include, a personal computer, tablet or smart phone.

Shimmer view information—generally but not necessarily comprising physical object spatial information in three spatial dimensions and physical object reflection information ("texture information")—can be rendered in real-time or offline to generate a dynamic visual representation of the physical object on an electronic display. In a dynamic visual representation of the physical object, one or more aspects of the shimmer view may change with time. A dynamic shimmer view may be recorded in a movie file, for example. Static renders of a shimmer view may also be generated by rendering a single frame rather than a continuous animation. In some examples, where the render is real-time, a user may interactively manipulate a user interface (comprising for example real or virtual buttons, sliders and dials) to change one or more aspects of the shimmer view, while the shimmer view is being displayed on the electronic display, and see the rendered object in the live shimmer view respond as the real physical object would. Example changes include rotating or changing the shape of the displayed physical object, changing the view position, translating the displayed physical object, and changing the relative positions of the illumination and the physical object. Static shimmer view information may be rendered to a single frame and stored in the form of an image file (example formats including but not being limited to JPEG and TIFF). Dynamic shimmer view information may be rendered to multiple frames and recorded as a movie file. Example formats including but are not limited to MP4, QuickTime, WMV and AVI. Shimmer view information may be stored in random access memory ready for rendering on an electronic display.

FIGS. 1 to 4 each show a digital photograph of a physical object 10 in the form of a picture in a frame, the digital camera having been at different positions and orientations ("camera pose") relative to physical object for each of the digital photographs. Each of the digital photographs in FIGS. 1-4 also include a plurality of pose markers 12. The plurality of camera pose markers 12 comprise a plurality of reference markers in the form of a plurality of binary square fiducial markers. The binary square fiducial markers take the form of ArUco markers, which generally comprise a plurality of distributed pixels. The published ArUco library and the web site opencv.org comprises open source computer code and instructions for the generation and use of ArUco markers. The plurality of camera pose markers 12 also comprise fractal color noise patterns. Photographs of the markers can be processed using the ArUco library code to determine camera pose information indicative of a camera pose. Generally, any suitable reference markers may be used including but not limited to ARToolKit, ARTag and AprilTag.

Figure 5:
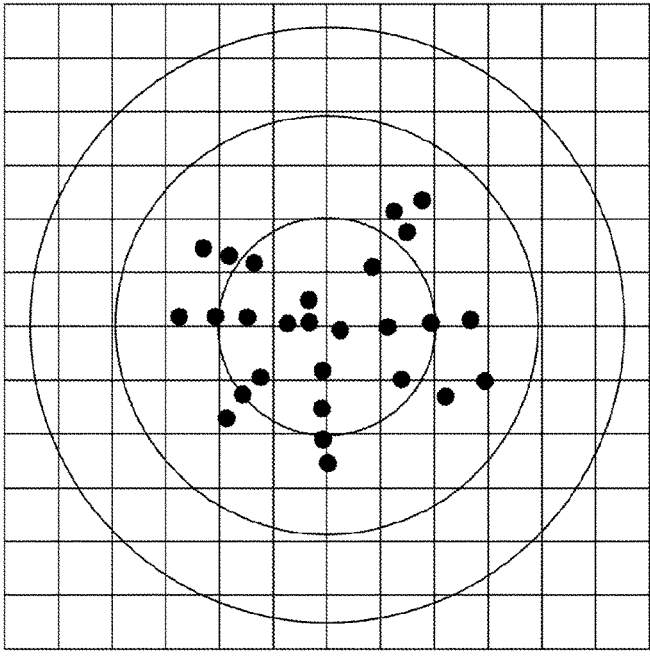
FIG. 5 is a graphical representation of a plurality of camera positions and orientations relative to the physical object of FIG. 1.

FIG. 5 is a graphical representation of a plurality of camera poses. The chart centre is directly above the object 10, and the dots represent camera positions relative to the physical object, with the camera nominally pointed at the physical object.

The four photographs shown in FIGS. 1-4 were taken with the topmost poses, represented in FIG. 5 as the four points closest to the centre of the diagram, so the distortion visible in these images is small.

Even though the poses of these four photographs are close, the play of light in each photograph is different, with the position and amount of specular reflection visible on the shiny picture frame differing markedly in each.

The physical object may generally be any suitable physical object, examples of which include but are not limited to fabric, clothes, jewellery, leather goods, a model of an aircraft, and crystalware.

In this but not necessarily in all embodiments, the plurality of camera pose markers 12 define an inner space 14 for receiving the physical object 10. The plurality of camera pose markers 12 are disposed on paper 16 in the form of a paper frame, however they may not be connected in other embodiments. A spatial coordinate system origin may be defined by the centre of the inner space 14, however it may be translated away from the centre. The physical object 10 is received within the inner space. In the present context, the plurality of camera pose markers 12 are arranged for determining, from an image of the plurality of camera pose markers 12, the spatial and angular position of a camera ("pose") that was used to generate the image.

Figure 6:
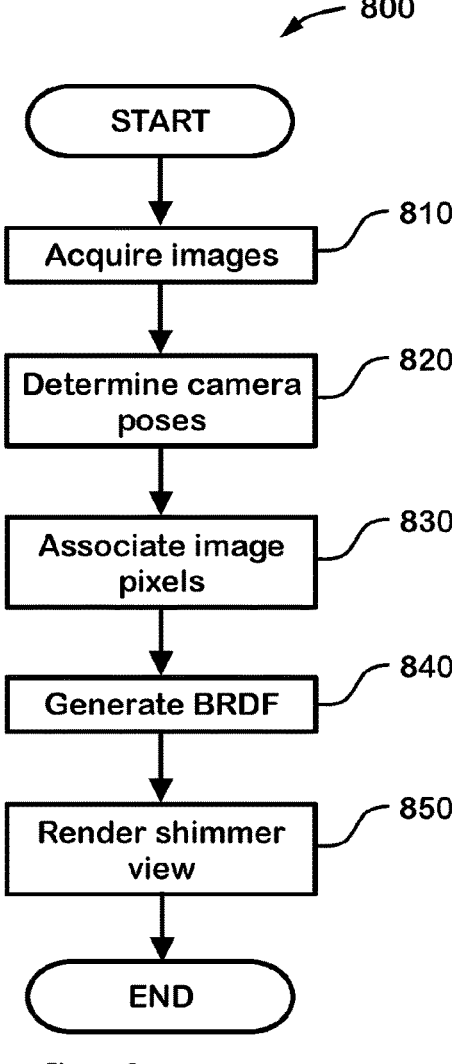
FIG. 6 shows a flow chart for an embodiment of a method for generating shimmer view information.

FIG. 6 shows a flow chart for an embodiment of a method 800 for generating shimmer view information, steps of which are described herein. In a step 810, digital optical image information is generated for a plurality of optical images of the plurality of camera pose markers 12 and the physical object 10 disposed at the plurality of camera pose markers 12. In this example, between 20 and 30 digital photographs were taken, however more (e.g. 100, 1000, 10000) or less (e.g. 4) may be taken for subsequent processing. The plurality of optical images can be associated with a plurality of optical camera poses. Optical camera pose information indicative of the plurality of optical camera poses associated with the plurality of optical images can be determined using the digital optical image information.

Image information in the form of digital optical images can be captured using at least one digital camera. For example, a camera with a 20 megapixel sensor, an 80 mm image-stabilized lens, a Xenon flash unit, ISO 100, exposure set to $\frac{1}{100}$ second can produce suitable images for producing a high-quality shimmer view. A CANON EOS-1D X Mark III or other DSLR may be used. However, a camera with a lower specifications, such as on an iPhone 12 or other smart device, can also be used with a commensurate drop in quality of the generated shimmer view. Examples of suitable image file formats for the image files include JPEG (EXIF 2.2) and RAW. Alternatively, a film camera may be used and the developed photographs digitally scanned to generate digital optical images.

The image information can be received by a processor in the form of a digital electronic device, examples of which include but are not limited to for example a computer server connected to the internet, a general purpose computer system, an embedded system, and a tablet computer. In the present example, the processor is in the form of a computer server comprising a logic device in the form of, for example, the INTEL XEON, AMD OPTERON or a suitably configured field programmable gate array (FPGA), connected over a bus to a random access memory of around 64 Gb and a non-volatile memory such as a hard disk drive or solid state non-volatile memory having a capacity of around 1 Tb. The processor comprises a computer network interface in the form of an IEE 802.3 interface for receiving the image information. The processor optionally comprises a user interface in the form of an electronic display, computer mouse and keyboard, or generally any suitable user interface for example a touch screen. The processor includes a video signal interface in the form of a HDMI, DVI or generally any suitable form of video signal interface.

Stored in the processor memory is a computer program for instructing the processor. The computer program, when executed by the processor, causes the processor to process the image information in accordance with embodiments disclosed herein. The computer program can take generally any suitable form, the source code can and be written in any programming language (examples of which include but are not limited to python, C #, C, C++, GO, R, and SWIFT) and compiled to form suitable object code for an executable file. The processor runs the executable file to processes the image information.

A camera pose is described with respect to a spatial origin with the assigned coordinates (0,0,0), for example, which is generally the centre of the set of camera pose markers, and with convenient units for spatial coordinates, such as millimetres, and convenient units for points in an optical image, such as the width of a sensor pixel. Dimensionless units may be used. Note that these units need not correspond to the same spatial size.

A pinhole camera model and the camera pose information can be used to generate a mapping ("projection") between a point on the object and a point on an optical image. The relationship between a point on a camera sensor $(x_p, y_p)$, and a point $(x, y, z)$ in the space the camera is pointing at is approximately given by the pinhole camera model, equations for which are:

$$(x_c, y_c, z_c) = R \times ((x, y, z) - T)$$

$$(x_p, y_p) = \frac{f \times (x_c, y_c)}{z_c} + (x_s, y_s)$$

An algorithm for calculating the pinhole model equations is stored in processor memory.

The first equation transforms a point in space (x,y,z) to a point $(x_c, y_c, z_c)$ relative to the camera (i.e. camera space), and the second equation transforms a point in camera space to a projected point $(x_p, y_p)$ on the camera sensor, and hence a pixel in an optical image, T is a translation vector describing the camera's position in space, R is a rotation matrix describing the camera's orientation in space, and $(x^c, y_c, z_c)$ is the transformed point with position relative to the camera instead of the origin. f is the focal parameter, which defines the distance from the centre of projection ("distance to the pinhole") at which a spatial distance of 1 corresponds to 1 pixel in the optical image. $(x_s, y_s)$ is the centre of projection, close to the centre of the optical image.

Other more accurate relationships between a point on the camera sensor and a point in the space of the camera is pointing at may incorporate separate focal parameters $(f_x, f_y)$ to account for pixel aspect ratio, radial and tangential distortion parameters, and offsets to the centre of projection to account for lens distortion. Where more than one camera is used to capture images, or where the lens focus position changes, these parameters may change between each photograph taken.

An example of another more accurate relationship in the form of an extended model incorporates the rotation matrix and translation vector R and T, separate focal parameters $f_x$, $f_y$, four radial distortion parameters, $k_1$, $k_2$, $k_3$, $k_4$, an offset to the centre of projection $x_s$, $y_s$, and two axial distortion parameters $p_1$, $p_2$.

Intermediate terms in this model are the point transformed to camera space $(x_c, y_c, z_c)$, undistorted projected points $(x_p,$ $y_t$), the radius, r, the radial and x and y distortions respectively $r_d$, $x_d$, $y_d$, and the result of the calculation is a projected point ($x_p$, $y_p$).

The equations which describe this example model are:

$$(x_c, y_c, z_c) = R \times ((x, y, z) - T)$$

$$\text{Let } (x_t, y_t) = \frac{(x_c, y_c)}{z_c}$$

$$\text{Let } r = \sqrt{x_t^2 + y_t^2}$$

$$\text{Let } r_d = 1.0 + k_1 r^2 + k_2 r^4 + k_3 r^6 + k_4 r^8$$

$$\text{Let } x_d = x_t r_d + 2 p_1 x_t y_t + p_2 (r^2 + 2 x_t^2)$$

$$\text{Let } y_d = y_t r_d + 2 p_2 x_t y_t + p_1 (r^2 + 2 y_r^2)$$

$$x_p = f_x x_d + s_x$$

$$y_p = f_y y_d + s_y$$

The distortion parameters, offset to the centre of projection, axial distortion parameters, and focal parameters are usually unlikely to change between photographs, but in some situations, such as when using a variable zoom lens, these parameters may change between photographs.

The pinhole model operation is not invertible, with a one dimensional array of positions from the optical centre of the camera passing through the object point (x, y, z) all mapping to the same projected pixel ($x_p$,$y_p$). This means that even if the camera pose is known, a pixel in a captured photograph might have originated from any point along a line, thus pixel depth information in a single two dimensional photograph is lost. Recovering this depth information can be achieved using embodiments disclosed herein. During estimation of depth information, it is convenient to map points between three dimensional space and three dimensional projected coordinates by incorporating an estimated depth of the point relative to the camera into the projected pixel, i.e. ($x_p$, $y_p$, $z_c$).

Using an open-source bundle adjustment library such as Ceres Solver (http://ceres-solver.org), camera poses can be estimated to high accuracy. Because embodiments determine camera pose information associated with an optical image, there may be latitude in the poses of the camera that are used when taking the digital photographs. The projection operation accuracy may be better than 0.1 image sensor pixels in the present but not necessarily in all embodiments. The camera poses for a set of photographs are estimated in step 820 by first locating common points in a set of photographs, estimating their three dimensional positions, and estimating camera poses. These initial estimates are commonly obtained using the reference markers. Ceres Solver can improve these initial camera pose estimates by estimating the total error in projecting three dimensional points into the photographs, then alternately adjusting the camera poses and estimated three dimensional point positions using a gradient descent method—for example, until the error in the projected points (the back-projection error) is minimized within desired tolerances.

Consequently, physical object spatial information indicative of a three dimensional representation of the physical object may be determined by associating image pixels in the plurality of images of the physical object with common points on the physical object's surface in step 830, to be described in more detail, using the plurality of digital photographs and the optical camera pose information.

An embodiment comprises using the physical object spatial information to associate a plurality of pixels in the plurality of optical images. For each point on the surface of the physical object as defined by the physical object spatial information, an associated plurality of pixels, up to one from each optical image, correspond to that point. The pixels are found by applying the camera pose transform to the point in the image, using the 3D position of the point from the physical object spatial information.

A bidirectional reflections distribution information in the form of a function (BRDF) or values therefore may be generated in step 840 using the associated plurality of pixels in the plurality of optical images. The BRDF is a function of four real variables (two spatial angles) that defines how light is reflected by an opaque surface. The BRDF is stored in the processor memory. The function takes an incoming light direction and an outgoing direction and returns the ratio of reflected irradiance exiting to the incoming irradiance incident on the surface from the incoming direction. A simplified definition of BRDF is given by:

$$f_r(\omega_i, \omega_r) = \frac{L_r(\omega_r)}{E_i(\omega_i)}$$

where $\omega_i$ is the angle of incidence of light, $\omega_r$ is the angle of reflected light, $E_i$ is the irradiance from angle $\omega_i$ i.e. applied light power per unit surface area, $L_r$ is the radiance from angle $\omega_r$, i.e. reflected light power per unit surface area. For a material exhibiting perfect Lambertian diffuse reflection the BRDF would have a constant value, and for a perfectly smooth, specular material the BRDF would be nonzero only where $\omega_r = -\omega_i$. To capture color information, an independent BRDF can be estimated over at least three wavelengths. Materials may exhibit a more complex BRDFs. A shimmer view may consequently use a more complex BRDF, as desired and suitable.

Because the BRDF is a multidimensional mapping, it may be difficult to determine a BRDF that completely describes a physical object's reflective properties. Approximations to a BRDF may be used. An example of an approximation for a BRDF is the Disney Principled BRDF model *Physically Based Shading at Disney, Brent Burley*, 2012. Other BRDF models may also be used as suitable and desired. Both the object geometry and the material properties may be represented within a processor in different ways as is suitable for different applications, physical objects, or user requirements. Example object geometry representations include but are not limited to (1) a polygonal mesh containing vertices, edges and faces, which may provide flexibility in the shape, and (2) a height map, which is a two-dimensional array of height values, with the array dimensions representing spatial X and Y locations. A height map may be suitable for rectangular objects, for example, with small height variations, such as cloth swatches. A polygonal mesh may comprise a plurality of coordinates for each corner of each polygon.

Associated with the object geometry is a linkage to a two-dimensional UV coordinate space, or texture space, stored in processor memory in which the material properties in the form of physical object texture information are represented. UV coordinates map a two-dimensional texture space to the surface of a three dimensional object. The mapping from UV to XYZ is arbitrary, and there are no rigid restrictions on how the mapping is constructed, except that such mappings are generally piecewise continuous. One example of a mapping similar to a UV mapping is the relationship between latitude/longitude (U=longitude, V=latitude) and the surface of the earth. This mapping is highly distorted and even discontinuous at the poles, yet provides a useful way to represent information on the three dimensional Earth's surface using a two dimensional mapping. A UV mapping can be created which maps the surface of the object to regions in UV space. Examples of such linkage is a mapping from each vertex to a unique point in UV space, which can be used with interpolation to define a mapping from any point on an object face to a unique position in UV space. Where the object geometry is represented as a height map, the X and Y dimensions of the height map may be used directly to index UV space, i.e. U=X and V=Y. The material properties are represented in UV space by the texture information ("texture map") comprising different values for the BRDF model at each point. The value of the BRDF at each point may be determined by fitting a BRDF model, such as the Disney model, to the pixel data in each aligned photo at the point. The texture maps may subsequently be used to render a shimmer view. One example of a set of such texture maps, for each UV coordinate includes a base color value containing RGB color information used to determine the base color at the point; a specularity value used to set the strength of specularly reflected light at the point; a roughness value defining the specular response at the point as a function of specular intensity with respect to incident light angle and viewing angle; a metallicity value defining the degree to which the material at the point imparts a colored tint to reflected light, and additional color values defining the color of the specular or metallic response. The geometrical representation of the three dimensional object, for example containing triangles and vertices, may contain a mapping from each vertex in the geometry to a position in UV space, with each point in a triangle defined by three vertices corresponding to a point interpolated in UV space from the three points in UV space corresponding to the three vertices.

The Disney model comprises the surface normal of the object, an RGB base color, a surface roughness estimate, a specularity estimate, and an estimate of metallicity. Other embodiments additionally include parameters to also model color travel, non-isotropic specular reflections, and other material properties used in physically-based rendering.

Texture map information indicative of a texture map can be generated using the associated plurality of pixels in the plurality of optical images.

Meshed physical object spatial information can be generated using the texture map information and the physical object spatial information.

The meshed physical object spatial information can be indicative of the surface. The meshed physical object spatial information may be defined by a plurality of polygons.

The texture map information and meshed physical information may be rendered in step 850 to produce a still render or a continuous real-time animated render of the shimmer view. Rendering may for example be performed by an implementation of the BRDF model, such as the Disney model. The rendering implementation produces pixel values at points on the surface of the object to be rendered, by calculating the equations of the BRDF model. The equations use as inputs the values in the texture information, and scene information such as the view position and light source positions. The bidirectional reflection distribution information and a WebGL shader model (WebGL is a Javascript API for modelling rendering graphics, designed and maintained by Khronos Group) is used to render the shimmer view, which can also use used to generate the video signals. Graphics acceleration hardware can be used with WebGL, which may assist in achieving the high resolution and frame rate necessary for a lifelike animation, such 3840×2160 pixels at 30 frames per second. The resulting shimmer view render is a lifelike still or animated image of the material which responds realistically to changes in surface shape, light position, or view position, showing the play of light on the material in a way that a standard photograph cannot.

The step 830 of associating the plurality of pixels can use the plane sweep algorithm. A depth map may be generated:

$$\text{depth}(x,y)=z$$

where (x,y) are coordinates of the spatial coordinate system.

Using the camera pose information and the optical image information, a depth map representing the object geometry may be generated using the plane sweep algorithm.

Broadly, the plane sweep algorithm takes as input a set of N optical images, each with associated camera pose information, and outputs a height map, representing the surface of the object being photographed in three dimensional space.

By use of associated camera pose information, each pixel in each optical image can be associated with a line of possible positions in three dimensional space converging on the optical centre, or pinhole, of the camera. With a single photograph, the three dimensional position of each pixel is ambiguous and cannot be determined, but with a collection of photographs, the three dimensional position of each pixel may be determined with a high degree of accuracy by finding positions for each pixel which correspond to similar pixels in other photographs.

The phase sweep algorithm iterates through a volume in space, at each three dimensional point searching for correspondences between pairs of pixels in the optical images to which that point projects. For example, if all the optical images were a photograph of a black dot in space at position (0,0,0), then when the plane sweep algorithm examined position (0,0,0), that point would map to the position of that black dot in all optical images, from which a strong match could be inferred. Even in a set of images with many similar features, it is usually unlikely for all of those features to be present in a photograph at a projected point other than the correct point. This property of including information from all optical images when determining if a spatial position is on the surface of an object may make the plane sweep algorithm very robust in the presence of weak textures, because many weak matches are combined to create the match signal.

The operation used to compare pairs of pixels generating a merit score, and the summation of merit scores from each pixel pair is used to determine the presence of the object surface at a point in space.

It is computationally expensive to compare pixels in every photograph against pixels in every other photograph: $N^2$ comparisons for every pixel, so the search for matches between pixels is limited to comparing pairs of images whose camera positions are relatively close to each other. Comparing the pixels from each photograph with the pixels in the two nearest photographs (in terms of camera position) gives good results. Because the appearance of pixels changes with the position of the camera, using only the two closest photographs actually improves the comparison process, because pixels are not too dissimilar.

The region of three dimensional space in which to search for matches is determined by the position and resolution of the chart used to determine the camera pose information. A process of bundle adjustment determines camera poses by iteratively adjusting camera poses and the estimated 3D position of known points appearing in a set of photographs, such as identifiable points on the paper 16, with a goal of minimising the reprojection error over all point correspondences. The reprojection error is the difference between an estimated position of a 2D point in an image, and its predicted 2D position given its estimated 3D position and the camera pose. Minimisation proceeds by determining gradients of functions of reprojection error with respect to each 3D point position and camera pose, and in each iteration, jointly adjusting each point position and pose in the direction of the gradient which will reduce the reprojection error, until the total error or change in error falls below a threshold. The camera poses at the end of the bundle adjustment process are accurate and consistent with the observed image data in the set of input photographs.

The camera poses may be determined in distance units defined by the chart (for example, pixels in the printed chart image), and with a three dimensional coordinate system oriented with the chart positioned substantially along a plane where Z=0, although the chart may be somewhat curved. If another resolution or coordinate system is required, then the camera pose information can be modified using scaling and rotation transforms to give the desired results. The chart itself and its cutout region determines the X and Y coordinates of the three dimensional space in which space is to be searched, and the Z region of three dimensional space is chosen such that the object being scanned is likely to appear within that region, both above and below the chart. For example, if the centre of the chart is assigned the position (0,0,0) in three dimensional space, the search region for the plane sweep algorithm may be in the region (−1024,+1024) for X, (−600,+600) for Y, and (−400,+400) for Z, requiring (2048×1200×800)=1,966,080,000 voxels to be searched.

The process of comparing pairs of pixels in photographs corresponding to a three dimensional point uses a merit function, which gives a numeric measure of the closeness of the match between the pair of pixels. The summation of the merit function values for a three dimensional point yields the merit score for that point, and this merit score is used to determine the presence of the surface of the three dimensional object at that point. Depending upon how the merit function is defined, a merit score may yield a high value or a low value to indicate the presence of the object surface. Assuming that the object surface appears only once at each (x,y) position (that is, the object is not self-occluding), the three dimensional point corresponding to the surface of the object at position (x,y,z) in a position in space, where x and y are known, and z is not, will usually contain the maximum (or minimum) merit score where z corresponds to the point on the surface. Thus, when all merit scores are computed in the three dimensional search volume, the Z position of the object surface for each position (x,y) can be determined by finding the maximum (or minimum) merit score in the one dimensional line along Z at (x,y).

Figure 7:
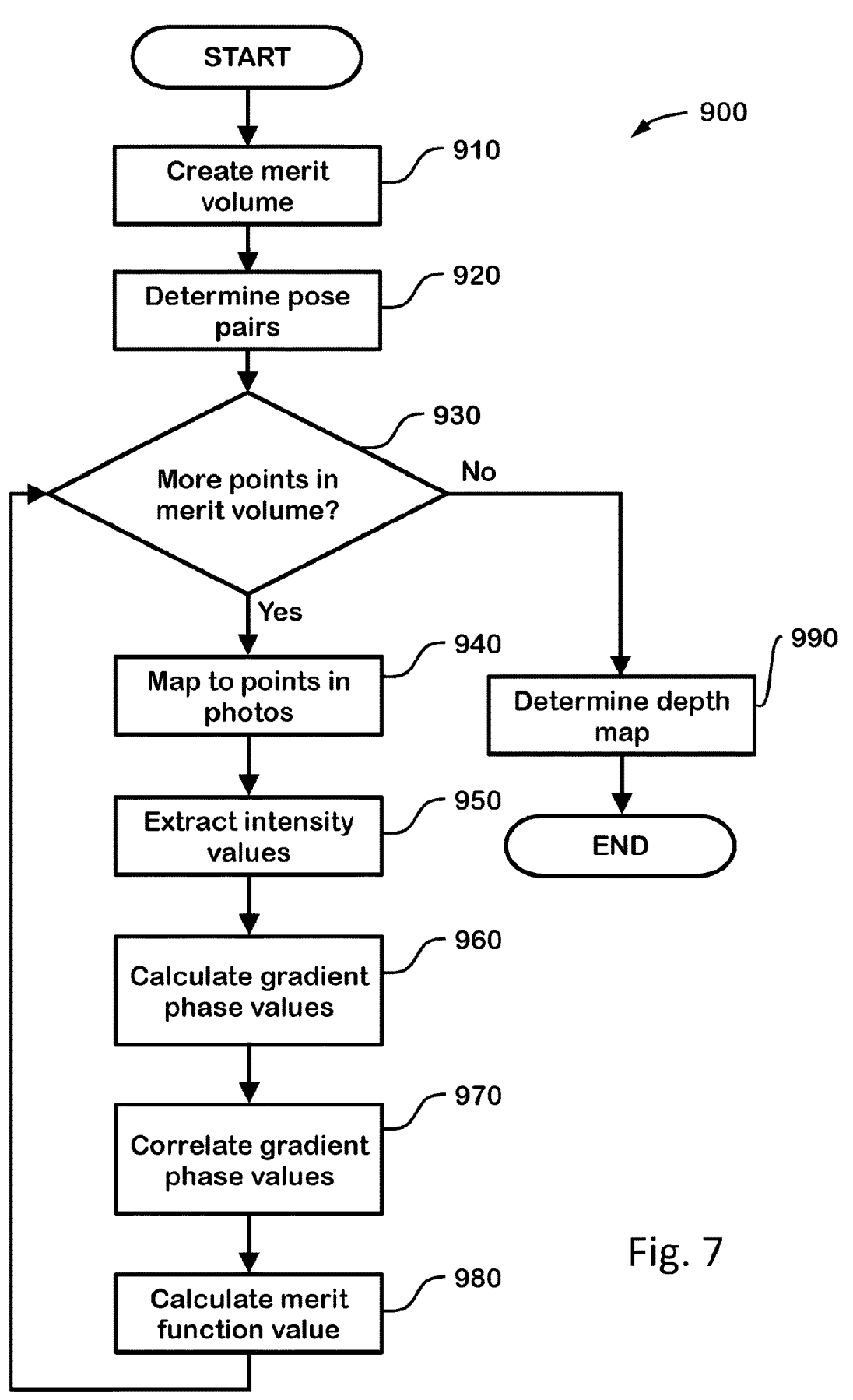
FIG. 7 is a flow chart for an implementation of step 830 of the embodiment of the method of FIG. 6.

FIG. 7 is a flow chart for an example implementation 800 of step 830 which will now be described. The inputs to implementation 900 are N Camera poses Ci=(Ti,Ri,f) (position,rotation,focal parameter), N optical images Pi, and a three dimensional bounding box B [(xlo,xhi),(ylo,yhi),(zlo,zhi)] in which to calculate the surface in appropriate units to achieve desired resolution (for example, 1 pixel in bounding box=0.01 mm).

In step 910, a three dimensional merit volume V is created of size (xhi-xlo,yhi-ylo,zhi-zlo) specified by a bounding box containing zero values, where each voxel (vx,vy,vz) represents a point in three dimensional space (vx+xlo,vy+ylo,vz+zlo). In the simplest implementation, the empty volume really does exist, and may contain>1B points, however sparse or optimised implementations are also possible.

In step 920, the camera poses are examined, and a list of nearby camera pose pairs to be matched is created. The pose pairs in the list may be determined as follows:

a. Map camera position to a normalized position on the surface of a unit sphere:

$$S_i = \frac{T_i}{|T_i|}$$

where $|T_i|$ is the $L_2$ norm of $T_i$ b. Measure the distance between the normalized position of every camera, $D_{ij}=|S_i-S_j|$ c. Sort the distance estimates $D_{ij}$ into ascending order $\{D_{i0,j0}, D_{i1,j1}, D_{i2,j2} \ldots \}$ d. Create a list of pairs L={(p₀, q₀), (p₁, q₁) . . . } by scanning this sorted list sequentially, adding an element (p,q) to the list if i. Dpq<0.15, and ii. Dpq>0.001, and iii. (q, p) is not already in the list, and iv. There are not already two pairs in the list (p, r) and (p, s) Step 930 determines whether more voxels (vx,vy,vz) exist in the merit volume for which a merit function value at that point has not yet been calculated. If there are, the next point in the merit volume is selected and the method 900 proceeds to mapping step 940.

In step 940, points in photos for each pose pair are determined, and in step 950, pixel intensity values are extracted at those points. In step 960, a gradient phase value is computed at each point, and in step 970, the gradient phase values for each pose pair are correlated to compute in step 980 a merit score. Steps 940 to 980 are described in more detail later.

If at decision step 930 no more points remain in the merit volume for which a merit score is yet to be calculated, the method 900 proceeds to step 990 in which a depth map, or point cloud, or set of three dimensional points, is generated. The set of points may for example be the points {(x,y,z):V(x,y,z)>t} for some constant threshold chosen according to the merit function and number of images.

Step 990 can produce either a point cloud or a height map, which can be processed to produce a computer graphics model of the geometry of the object being scanned. The input of the plane sweep algorithm can comprise at least one of, for example, processed photographs or intermediate aligned images, optical camera pose information, information indicative of adjacent optical image, and an empty volume:

$$m_{xyz}$$

in which to calculate a cost function. The empty volume comprises a three dimensional array of floating point numbers in memory. It is possible to store sparse information in a region close to the estimated surface. One optional optimization strategy is to down sample the photographs, e.g. to ¼ dimensions/¹⁄₁₆ area, modify the camera pose to account for the smaller images, and to calculate range in a volume ¹⁄₆₄ of the possible volume at full resolution. A height map is determined for the smaller down sampled volume, and the Z-range in this down sampled volume (for example, Zmin=−40, Zmax=+60) is multiplied by 4 and a constant such as 30 pixels added to create a full resolution Z-range of −190 (−40×4−30) up to +270 (60×4+30), so for a 1024-pixel-wide height map a full merit volume would be 1000×1000×460=460,000,000 voxels.

A value for the merit function may be calculated for each point in the empty volume. The merit function is used to determine if the surface of an object is at a point. For example:

$$\text{depth}(x,\, y) = \underset{z}{\text{argmax}}\, (M_{xyz})$$

"arg max z of M(x,y,z)" means "The value of z such that M(x,y,z) has the maximum value", so it is a two dimensional function consisting of the Z values containing the maximum merit score along lines of constant (x,y). After the set of points has been determined in step 990, the method 900 terminates.

Steps 940 to 980 for calculating the value of the merit function at a point in the empty volume will now be described. In step 940, the point in the merit volume may be mapped to a point in each photograph using the optical camera pose information. In step 950, intensity information P may be extracted for the position in each photograph using the projection operation corresponding to the camera pose. Where the position does not fall exactly on an image pixel interpolation can be used to estimate an image intensity value, but sufficient accuracy can be obtained by taking the intensity information of the nearest image pixel. Intensity information is directly proportional to image pixel sensor counts, and for example may range in a value from 0 to 16,384. The optical images designated I and j are paired and a pair merit value $M_{ij}$ is determined. The value of the merit function is $\Sigma M_{ij}$. Examples of merit functions include but are not limited to:

Sum of squared differences (SSD):

$$C_{ij} = \left|(P_i - P_j)^2\right|$$

Normalized correlation:

$$M_{ij} = \frac{\sigma_{P_i} \times_{P_j}}{|P_i| \times |P_J|}$$

where $P_i$ and $P_j$ are vectors ("list") of—in this but not necessarily all embodiments—the intensity value of photo pixels for a single point of the object in the plurality of optical images. Both SSD and correlation can be calculated using either grey-level intensity or with color (r,g,b) pixels. In the case of color pixels, Euclidian distance between (r,g,b) tuples can be used instead of the simple difference of the SSD, and the dot product used instead of multiplication for correlation. In practice, because most image information is carried by image intensity, grey level intensity may generally be used. This calculation may require billions of computations.

Using the intensity values of the pixels defined by the image information may not work very well, because, for example:

The intensity for a single point may substantially change for different camera poses, so the sum of square difference is generally not zero Some materials may reflect light differently when incident at different angles, for example satin reflects brightly at some angles and not so brightly at others Shiny materials such as a metal suffer from specular reflection of the illumination light, for example, which means high intensity for some camera angles.

These issues can be partially ameliorated by pre-processing images, however they may not be sufficient, for example small signals may be swamped by noise and large signals can propagate through the merit volume creating false readings.

The applicant has determined that using gradient phases of the intensity of the photo pixels may provide a superior result for determining a merit function. In step 960, a gradient phase value is calculated at each image point.

$$\oslash = \frac{\Delta}{|\Delta|} = \frac{\left(\frac{\partial}{\partial_x}, \frac{\partial}{\partial_y}\right)}{\sqrt{\left(\frac{\partial}{\partial_x}\right)^2 + \left(\frac{\partial}{\partial_y}\right)^2}}$$

Phase can be expressed as a 2-vector (p,q), where a phase of ø is represented by the vector (cos ø, sin ø). This representation is convenient because it does not contain the discontinuity where $\square$=0 or ø=2π, and it can be calculated without use of the computationally expensive sin and cos functions. Using this representation, the phase of the image intensity image P at an image pixel can be expressed mathematically as:

$$\emptyset(x,\, y) = (p,\, q) = \frac{\Delta(x,\, y)}{|\Delta(x,\, y)|} = \frac{\left(\frac{\partial P}{\partial x}(x,\, y),\, \frac{\partial P}{\partial y}(x,\, y)\right)}{\sqrt{\left(\frac{\partial P}{\partial x}(x,\, y)\right)^2 + \left(\frac{\partial P}{\partial y}(x,\, y)\right)^2}}$$

As the image is discrete and not continuous, an approximation to the partial derivative is used, i.e $$\frac{\partial P}{\partial x}(x,\, y) \cong \frac{P(x+1,\, y) - P(x-1,\, y)}{2}$$

In step 970, a merit score $m_{ij}$ can be calculated for two phase values $(p_1, q_1)$ and $(p_2, q_2)$ by direct correlation, i.e., $(p_1 \times p_2 + q_i \times q_2)$ $$m_{ij} = |\oslash_i \times \oslash_j|$$

In step 980, the merit function value can be calculated at a position (x,y,z):

$$m(x,\, y,\, z) = \sum_{(i,j)\in L} \frac{\emptyset_i(C_i(x,\, y,\, z)) \times \emptyset_j(C_j(x,\, y,\, z))}{\sqrt{|L|}}$$

where L is the set of image pairs (i,j) to be compared, Ci is the camera pose function which maps the point (x,y,z) to a point (xp,yp) on a photograph i, ø_i is the gradient phase value calculated at point (xp,yp), and |L| is the number of pairs being compared. Where any projected positions $C_i(x,y,z)$ fall outside a photograph, they are removed from the calculation and L is reduced accordingly. $\sqrt{|L|}$ is a normalization factor that makes merit scores comparable where the number of participating images changes.

After calculation, the merit function value is placed in the merit volume at the position corresponding to the selected point.

This approach in calculating the values of the merit function have advantages which may include:

The values of the merit function may have the same vector magnitude of 1, and so:

Matches can be made on weak or strong textures, because the direction of the gradient is invariant to the strength of the texture Strong good matches may not overwhelm weak matches, because strong matches may not yield a merit function value substantially larger than weak matches.

Strong input signals, such as specular reflections, which have high image intensity, may not contribute strongly to the merit score, because a numerically large image gradient may not yield a numerically large gradient phase.

Consistent merit statistics:

With no match, the signal generally has a zero mean, because a gradient phase has a zero-mean, the product of two uncorrelated gradient phases has a zero mean, and the sum of zero-mean values has a zero mean.

After normalization by dividing by the square root of L, where L is the number of image pairs, the variance is a known constant, because the statistics of an uncorrelated match are identical for all inputs.

A hard threshold may be applied to determine whether a match is good or bad for any set of images, for example, a merit value below 0.6 indicating no usable match, because the noise variance is known, so it is possible to calculate a match probability for each match value.

Experiment has determined that the resulting depth estimate may be more reliable than that obtained using other methods.

Efficient merit volume calculation:

Experiment has determined that the algorithm may work well if the closest gradient phase value to a projected point is used, rather than a gradient phase value interpolated from an exact projected position, thus the gradient phase value need only be calculated for each pixel in the optical image, and not during merit function calculation.

Phases can be quantized down to 8-bits, by calculating the angle of the gradient phase value, scaling it to the range [0 . . . 255], then quantizing it to an integer, for example $$\left( \operatorname{atan2}(\phi) * \frac{128}{\pi} \right) + 128,$$

then a merit function comparing two phases can be implemented efficiently by using a look-up table on two 8-bit phase values, thus reducing memory requirements to store the gradient phase values, and reducing merit function calculation to a simple table lookup.

Figure 8:
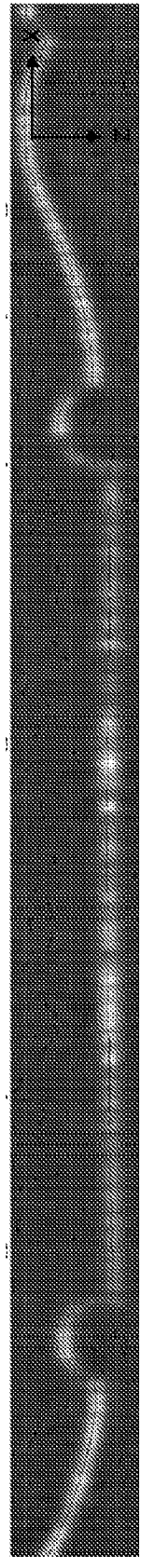
FIG. 8 shows a slice through two examples of calculated merit volumes.
Figure 8:
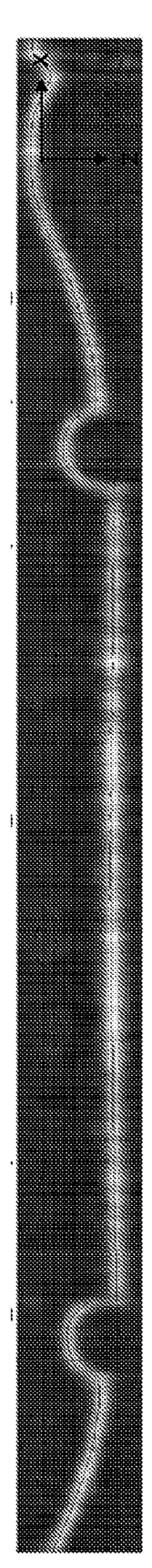
Figure 10:
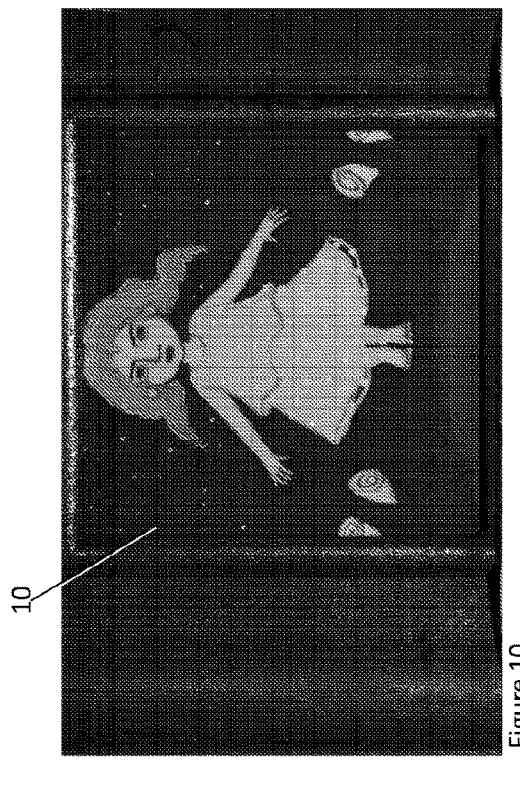
FIGS. 9 to 12 show example still shimmer views of the physical object.
Figure 12:
Figure 9:
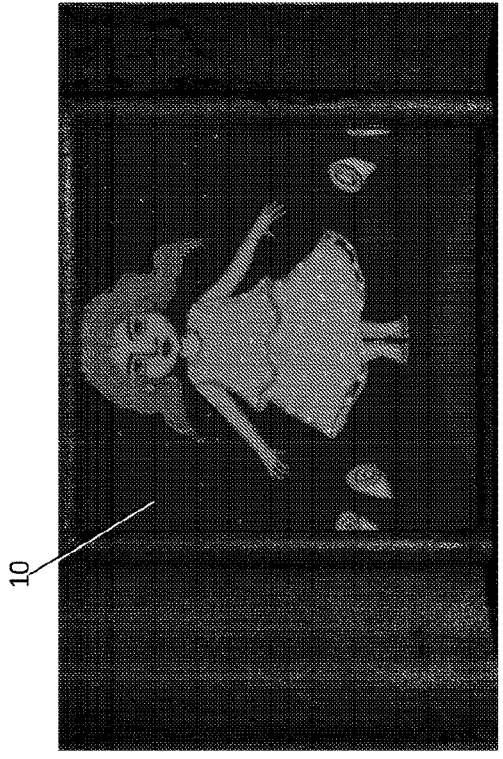
Figure 11:
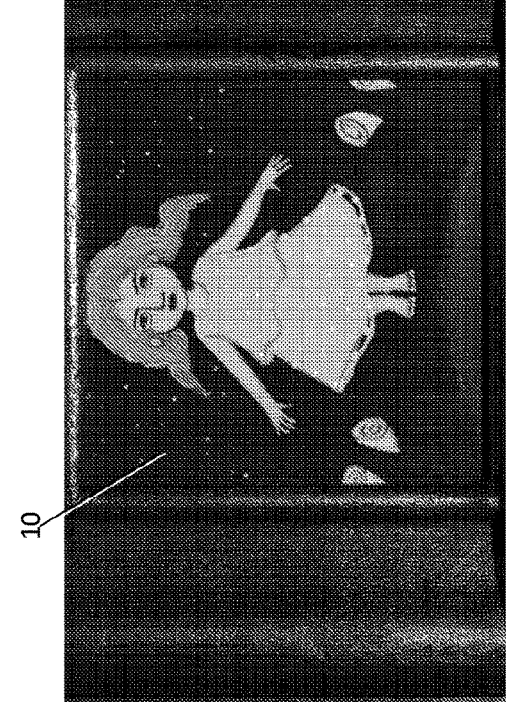

FIG. 8 shows a slice through each of two different merit volumes, the top merit volume being generated without use of gradient phase, and the bottom generated with use of the gradient phase. The percentage of range estimates requiring repair is 17.5% for the top slice generated without gradient phase, and significantly less at 0.16% for the bottom slice generated using gradient phase.

While gradient phase may have at least one advantage for use with the plane sweep algorithm, for estimating material appearance it may also has a disadvantage. The camera poses required for estimation of material appearance are different, covering the object from many different angles. This means that the image gradients may differ a great deal from photo to photo, even if the poses are spatially close. In the worst case, one photograph may be taken with the camera rotated by 180 degrees with respect to its closest neighbour in pose, in which case gradient phase is negated, contributing a negative value to the merit score in the case of a match. This case is not uncommon as the photographer steps around the object. However, this disadvantage can be ameliorated as described below.

In more common cases where the plane sweep algorithm is used, such as depth estimation using multiple cameras mounted within the one device, such as an iPhone, there will be no such rotation between poses and camera poses may not contain any rotation component which would damage merit score calculation.

For the application of estimating material appearance, a further step can be used to facilitate use of gradient phase during the matching process. To ameliorate the above mentioned disadvantage, and make image gradients comparable between image pairs, an intermediate space is used, common to all photographs, in which gradients may be calculated. An example of such as a space is a plane passing through the chart. Using the projection operation, intensity pixels from the photographs are mapped to the chart plane, and gradients calculated with respect to the (x,y) coordinates of the chart plane, instead of with respect to the (x,y) coordinates of each photograph. Such gradients are now comparable between images and can be used to calculate merit scores in the plane sweep algorithm.

Using this embodiment, the location of a three dimensional surface can be determined from the plurality of optical images.

To improve resistance to noise, the merit volume may be blurred using a 3 dimensional Gaussian kernel, with standard deviation of 2.5 voxels, before determining the location of the three dimensional surface.

FIGS. 1 to 4 show example digital photographs of an example object and chart, and it can be seen that the chart is in different positions in the frame of each photograph, and the features on the object do not directly correspond with image position between photographs.

FIGS. 9 to 12 show example aligned images of the physical object 10 obtained using the disclosure herein, with each common position in the four images corresponding to a single position on the physical object, with the pixel association having a resolution of better than 1 pixel. The chart and features of the object appear at the same coordinates in each image, enabling generation of shimmer view information for rendering as a shimmer view. The play of the light of the physical object, especially the reflective frame, can be seen as if the object was tilted at different angles with respect to an illuminating source.

Variations and/or modifications may be made to the embodiments described without departing from the spirit or ambit of the invention. The present embodiments are, therefore, to be considered in all respects as illustrative and not restrictive. Reference to a feature disclosed herein does not mean that all embodiments must include the feature.

Prior art, if any, described herein is not to be taken as an admission that the prior art forms part of the common general knowledge in any jurisdiction.

In the claims which follow and in the preceding description of the invention, except where the context requires otherwise due to express language or necessary implication, the word "comprise" or variations such as "comprises" or "comprising" is used in an inclusive sense, that is to specify the presence of the stated features but not to preclude the presence or addition of further features in various embodiments of the invention.

The invention claimed is:

1. A method for generating shimmer view information for a physical object, the method comprising the steps of:
   generating image information for the physical object indicative of a plurality of photographs of the physical object associated with a plurality of camera poses;
   generating shape information indicative of the shape of the physical object;
   generating physical object reflection information indicative of a light reflective property of the physical object; and
   processing the image information to determine the plurality of camera poses;
   wherein for each point of a plurality of points of the physical object, a plane sweep algorithm is executed to associate a plurality of pixels defined by the image information corresponding to the point on the surface of the physical object and calculate a merit function comprising a gradient phase.

2. The method defined by claim 1, wherein the plurality of photographs of the physical object are also of a plurality of pose markers.

3. The method defined by claim 1, wherein the physical object reflection information comprises bidirectional reflection distribution information.

4. The method defined by claim 3, wherein the bidirectional reflection distribution information conforms to a bidirectional reflection distribution.

5. The method defined by claim 4, comprising rendering the shimmer view information using a WebGL shader model.

6. A non-transitory processor readable tangible media including program instructions which when executed by a processor causes the processor to perform the method defined by claim 1.

7. A processor for generating shimmer view information for a physical object, the processor comprising memory in which is stored program instructions which when executed by the processor causes the processor to perform the method defined by claim 1.

8. A method for generating shimmer view information for a physical object, the method comprising associating a plurality of pixels in a plurality of optical images of a physical object, wherein the plurality of optical images are associated with a plurality of camera poses with respect to the physical object;
   disposing the physical object at a plurality of camera pose markers;
   generating image information for the plurality of camera pose markers and the physical object disposed at the plurality of camera pose markers;
   using the image information to determine camera pose information indicative of the plurality of camera poses associated with the image information;
   determining physical object spatial information indicative of a three dimensional representation of the physical object using the image information and the camera pose information; and
   using physical object spatial information to associate a plurality of pixels in the image information;
   wherein associating the plurality of pixels in the plurality of optical images comprises comparing pixels using a merit function using a gradient phase of pixels within the image information.

9. The method defined by claim 8, wherein the associated plurality of pixels correspond to a same point on a surface of the physical object.

10. The method defined by claim 8, wherein the shimmer view of the physical object includes a visual representation of the object's external geometry and a representation of the reflection of an illuminating light from the object's surface.

11. The method defined by claim 10, further comprising rendering the shimmer view information to generate an interactive visual representation of the physical object on an electronic display.

12. The method defined by claim 8, further comprising generating texture map information indicative of a texture map of the physical object using the associated plurality of pixels in the plurality of optical images.

13. The method defined by claim 12, further comprising generating meshed physical object spatial information indicative of the surface using the texture map information and the physical object spatial information.

14. The method defined by claim 8, further comprising using an intermediate space in which gradient phases are calculated.

15. A processor for generating shimmer view information of a physical object, the processor being operable to execute the method defined by claim 8.

16. A non-transitory processor readable tangible media including program instructions which when executed by a processor causes the processor to perform the method defined by claim 8.

* * * * *